June 27, 1967  L. S. SULLIVAN, JR  3,328,101
BEARINGS AND METHOD OF MANUFACTURE
Original Filed Dec. 10, 1959  5 Sheets-Sheet 1

BEFORE   AFTER
MOLDING  MOLDING

INVENTOR.
Leo S. Sullivan, Jr.
BY
Albert H. Reuther
HIS ATTORNEY

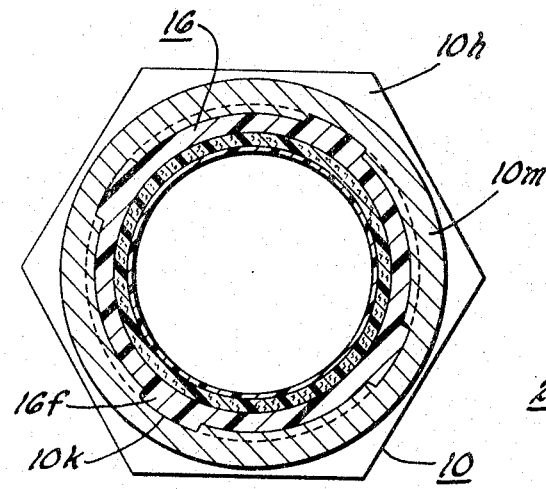
Fig. 1-b
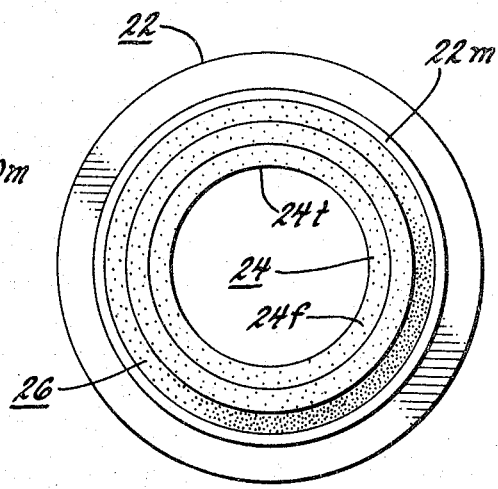
Fig. 2-b
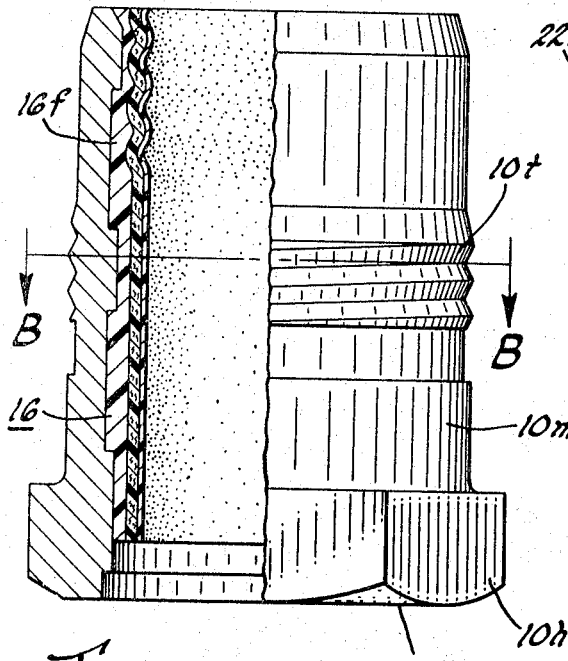
Fig. 1-a
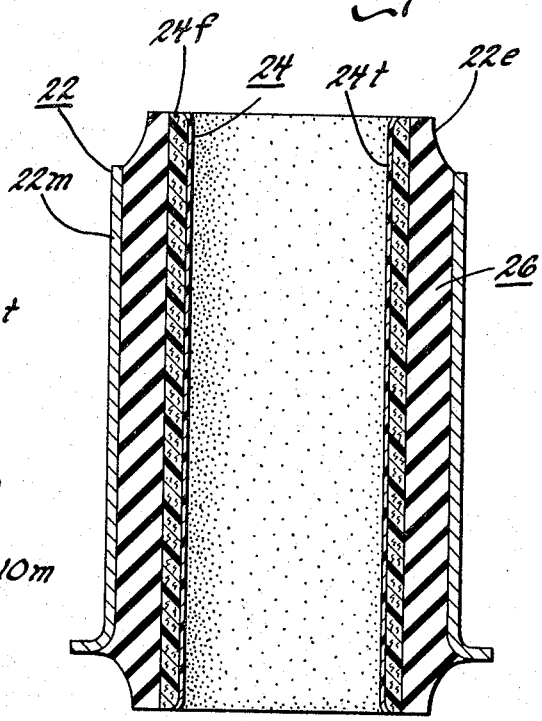
Fig. 2-a
INVENTOR.
Leo S. Sullivan, Jr.
BY
Albert H. Reuther
HIS ATTORNEY June 27, 1967 L. S. SULLIVAN, JR 3,328,101
BEARINGS AND METHOD OF MANUFACTURE
Original Filed Dec. 10, 1959 5 Sheets-Sheet 4

INVENTOR.
Leo S. Sullivan, Jr.
BY Albert H. Reuther
HIS ATTORNEY

June 27, 1967 L. S. SULLIVAN, JR 3,328,101
BEARINGS AND METHOD OF MANUFACTURE
Original Filed Dec. 10, 1959 5 Sheets-Sheet 5
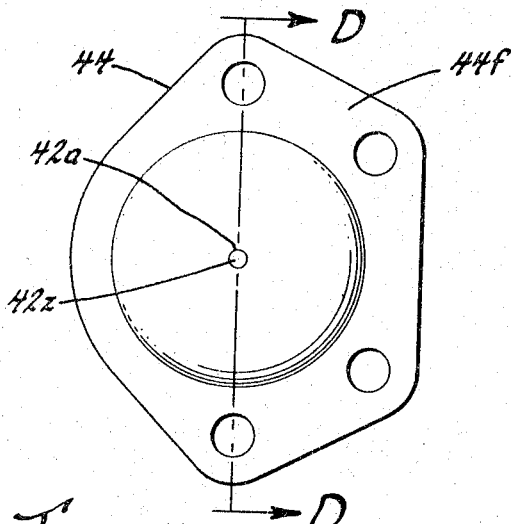
Fig. 4-c
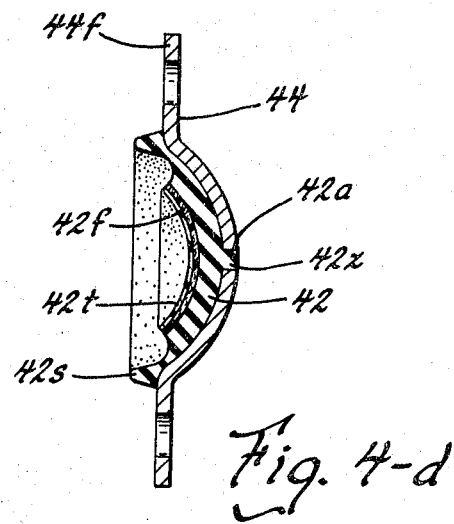
Fig. 4-d
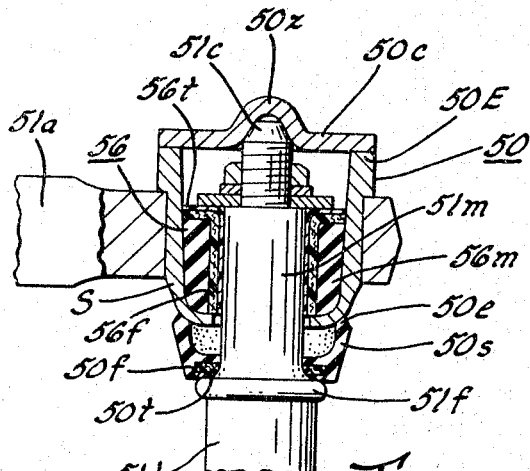
Fig. 5
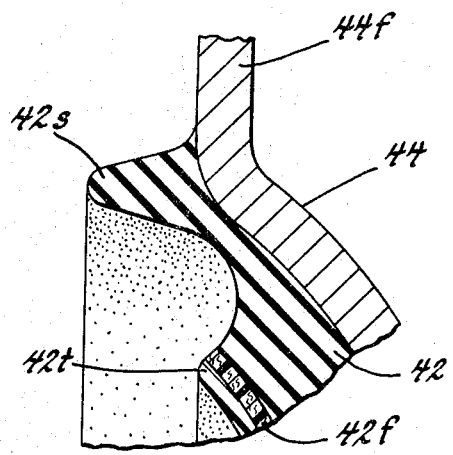
Fig. 4-e
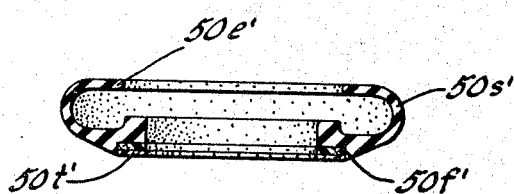
Fig. 5-a
INVENTOR.
Leo S. Sullivan, Jr.
BY
HIS ATTORNEY United States Patent Office 3,328,101
Patented June 27, 1967

3,328,101
BEARINGS AND METHOD OF MANUFACTURE
Leo S. Sullivan, Jr., Dayton, Ohio, assignor to General Motors Corporation, Detroit, Mich., a corporation of Delaware
Original application Dec. 10, 1959, Ser. No. 858,656, now Patent No. 3,097,060, dated July 9, 1963. Divided and this application May 28, 1965, Ser. No. 459,751
2 Claims. (Cl. 308—238)

This is a divisional application based upon copending parent application S.N. 858,656—Sullivan filed Dec. 10, 1959, now Patent 3,097,060—Sullivan issued July 9, 1963 and another divisional application S.N. 255,123—Sullivan filed Jan. 30, 1963, now Patent 3,211,483—Sullivan issued Oct. 12, 1965.

This invention relates to bearing surfaces and particularly to production thereof in a molding procedure adapted simultaneously to produce a cured and bonded combination of resilient as well as wear-resistant materials together for noise isolation and elimination of lubrication problems.

An object of this invention is to provide a new and improved bearing surface relative to molded elastomeric material such as natural and synthetic rubber that is simultaneously cured and bonded together with a woven preform having a fluorine containing synthetic resin surface for wear resistance resiliently backed by the elastomeric material.

Another object of this invention is to provide a molding procedure for bushing and ball joint bearing surfaces and the like wherein there are steps of placing a preform of polytetrafluoroethylene woven on an inner bearing surface backed by phenolic-impregnated cotton relative to a mold part such as a mandrel as well as a mold base, filling a cavity between the preform and an outer metal portion with elastomeric rubber-like material under pressure as well as in a semi-fluid condition and simultaneously curing as well as bonding the elastomeric material together with the preform into a predetermined contour of polytetrafluoroethylene surface weaving mechanically locked against rotation relative to the phenolic-impregnated cotton that adheres firmly to the rubber-like materal.

Another object of this invention is to provide a bushing and procedure for making the same whereby a metal sleeve is placed into a portion of a mold, a woven tubular preform is fitted concentrically thereto relative to a mandrel immediately adjacent to a fluorine containing synthetic resin surface on a phenolic-impregnated fibrous backing construction of the preform, forcing uncured elastomeric material in a semi-fluid condition as a filling in space between the preform and metal sleeve so that the preform including the fluorine containing synthetic resin surface conform to mandrel shape that can be cylindrical as well as threaded, simultaneously curing as well as bonding the elastomeric material under conditions such as predetermined heat and pressure into adhesion relative to both the metal sleeve and phenolic-impregnated fibrous backing of the preform removable from the mold portion and mandrel as a unitary assembly.

A further object of this invention is to provide a permanently lubricated ball joint and socket structure including a combination ball seat and elastomeric compression means integral with an annular sealing lip portion adapted to engage a socket body adjacent to where a cover fits complementary thereto at a location laterally outside a partially spherical bearing surface of polytetrafluoroethylene woven relative to a phenolic-impregnated fiber backing which is bonded and cured simultaneously with the elastomeric means in a unitary structure.

Another object of this invention is to provide a permanently lubricated ball joint and socket structure having a partially spherical preform of phenolic-impregnated cotton as a backing for polytetrafluoroethylene fibers woven in locking engagement therewith to be engageable by the ball and resiliently urged into engagement therewith by a rubber-like elastomeric material simultaneously cured and bonded therewith and having an annular sealing lip portion integral therewith for resiliently engaging a casing of the ball joint and socket structure in a location adjacent to where a cover fits thereto such that an effective dirt seal, for example, is provided.

Further objects and advantages of the present invention will be apparent from the following description, reference being had to the accompanying drawings wherein preferred embodiments of the present invention are clearly shown.

In the drawings:

FIGURE 1 is a composite elevational view of before and after structural relation in a molding procedure in accordance with the present invention.

FIGURE 1–a is a partially sectioned elevational view of a bushing assembly made in the procedure indicated for FIGURE 1.

FIGURE 1–b is an end sectioned view of the bushing assembly taken along line B—B in FIGURE 1–a.

FIGURE 2 is a cross-sectional elevational view of a bushing being manufactured by procedure in accordance with the present invention.

FIGURE 2–a is an elevational cross-sectional view of the bushing shown in FIGURE 2.

FIGURE 2–b is an end view of the bushing of FIGURE 2–a.

Figure 4:
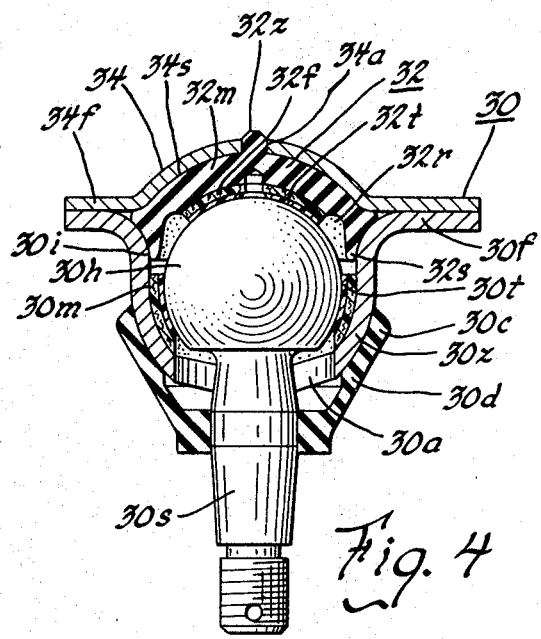
FIGURE 4 is a cross-sectional elevational view of a ball joint and socket assembly including parts of FIGURE 3.

FIGURE 4–a is an end view of a component in accordance with the present invention for the ball joint and socket assembly of FIGURE 4.

FIGURE 4–b is a cross-sectioned elevational view taken along line B—B in FIGURE 4–a.

FIGURE 4–c is an end view of a cover for the ball joint and socket assembly of FIGURE 4.

FIGURE 4–d is a cross-sectioned elevational view taken along line D—D in FIGURE 4–c.

FIGURE 4–e is a fragmentary enlarged sectional view of a portion of FIGURE 4–d.

FIGURE 5 is a partially sectioned view of a pivot assembly including a bushing and sealing member in accordance with the present invention.

FIGURE 5–a is a cross-sectioned elevational view of a seal with a bearing surface portion manufactured in accordance with the present invention.

Efforts are continually being made to improve pivotal joints such as for suspension systems on motor vehicles. Use of elastomeric materials for bushings as well a ball joint and socket structures has been known but involves a disadvantage due to wear and deterioration or aging of the elastomeric material, for example. Some synthetic resins having a relatively high fluorine content such as polytetrafluoroethylene (Teflon) have considerable wear resistance and are particularly advantageous for use in pivotal structures because they possess high temperature and chemical stability as well as resistance to penetration of water and water vapor. However, synthetic resin material such as polytetrafluoroethylene cannot be readily and satisfactorily bonded to itself or other material such as metals, elastomers, synthetic resins and the like. For purposes of noise isolation, it is desirable to provide a bearing surface of wear resistant synthetic resin and in addition to have a supporting part integrally joined and simultaneously formed therewith as made of a wide variety of materials, particularly an elastomeric material, such as natural rubber, butadiene-acrylonitrile copolymer, butadiene-styrene copolymer, polychloroprene as well as thermosetting and thermoplastic resins such as phenolic and vinyl resins compatible for bonding relative to a metal as well as an elastomeric material without any adhesion layer therebetween. The use of a suitable adhesion cement involves inconvenience as well as danger of separation or misalignment of the bearing surface relative to a supporting part without benefit of a resilient backing as provided by elastomeric material useful to compress material forming the bearing surface for enhancing engagement thereof relative to a pivotal member such as a ball joint or pivotal suspension pin mounting. Benefits of this elastomeric material backing are lost when a synthetic resin surface alone is provided for bearing purposes relative to a ball joint or pivot pin. In accordance with the present invention, there is provided a procedure whereby a single cure operation is effective upon elastomeric material as well as a phenolic-impregnated fabric for curing and setting both simultaneously. The rubber-like elastomeric material as well as a preform of phenolic-impregnated fabric to which Teflon thread is mechanically woven assures finishing and joining in a single operation to provide a resiliently backed, wear-resistant bearing surface relative to which noise is isolated by the elastomeric material and lubrication thereof is not a necessity. Use of phenolic resin alone as a backing for Teflon results in a hard and rigid structure which retains its shape but which does not afford noise isolation whereas use of an elastomeric material such as rubber and the like as a backing for phenolic-impregnated fabric to which the Teflon is woven along a bearing surface results in a resilience and elasticity which is particularly desirable and inexpensive to attain in accordance with the present invention involving a single curing operation effective upon both phenolic resin as well as rubber-like elastomeric material simultaneously.

Figure 1:
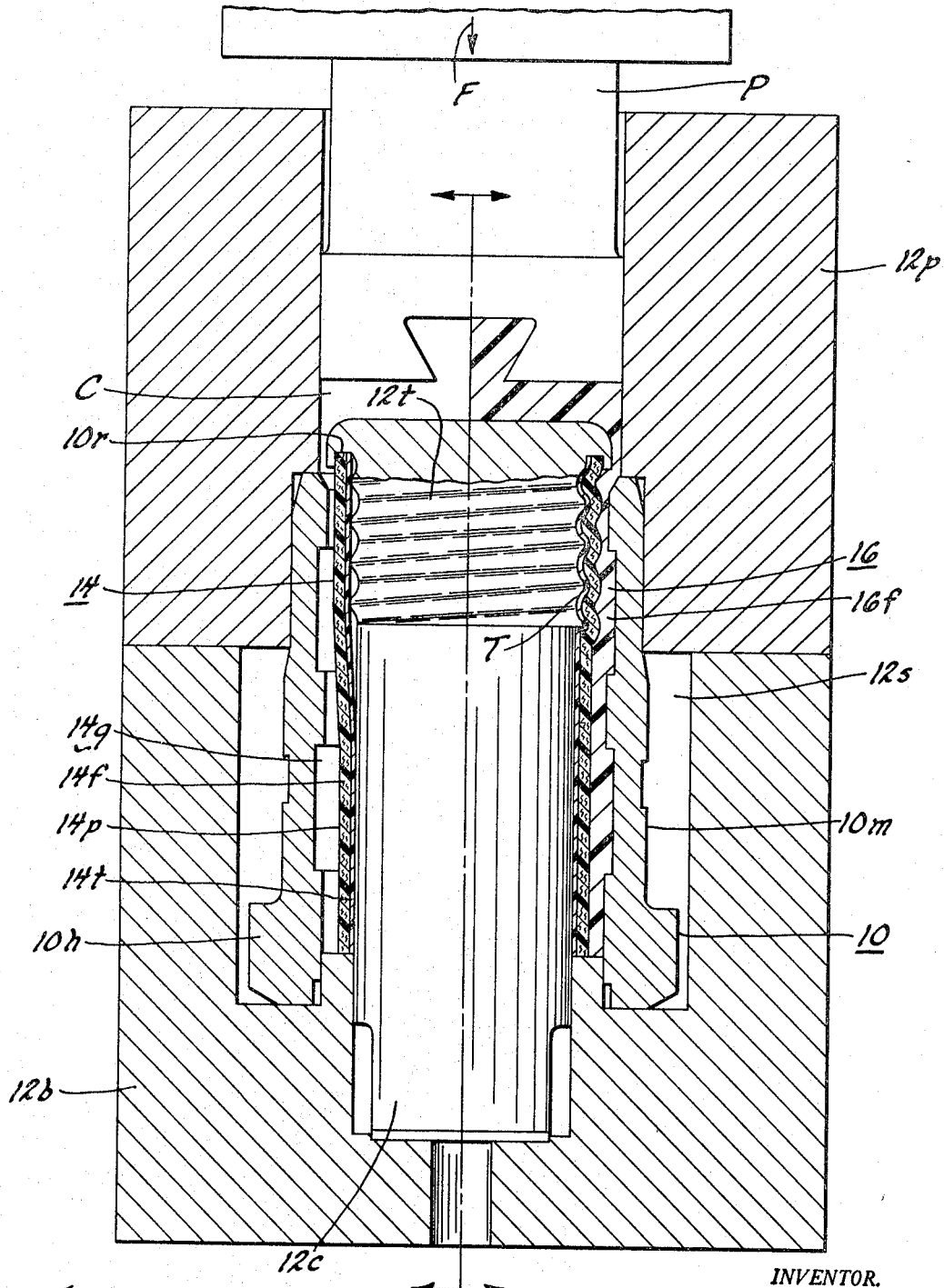

FIGURE 1 illustrates a molding sequence in accordance with the present invention for forming a vehicle suspension system control arm bushing generally indicated by numeral 10. The bushing per se is illustrated in views of FIGURES 1–a and 1–b and includes only an outer cylindrical metal member 10m having a hexagonal-shaped hub portion 10h integral therewith along one end thereof and provided with a plurality of threads or a threaded portion 10t as visible in FIGURE 1–a. Apparatus for carrying out procedure in accordance with the present invention includes a mold base 12b provided with a mold core 12c having a threaded end portion 12t visible in FIGURE 1. Complementary to the mold base 12b there is a transfer pot 12p or complementary cover portion adapted to fit adjacent to a space 12s into which the metal member or sleeve 10m is positioned after a woven tubular preform generally indicated by numeral 14 is placed on the mold core 12c. The first step of placing the preform 14 on the mold core involves having a fibrous portion 14f impregnated with uncured phenolic resin indicated such as at 14p relative to textile fabric such as cotton that is interwoven with synthetic thread of polytetrafluoroethylene 14t as a bearing surface along an inner periphery of the preform 14. The left portion of the composite view of FIGURE 1 illustrates this preform in an uncured condition as loosely spaced from the metal member 10m located radially outside thereof with a gap 14g therebetween. The mold core has an annular recess 10r into which one end of the preform 14 fits as illustrated in a partially sectioned portion of FIGURE 1. With both the metal bushing member 10m and woven tubular preform 14 concentrically placed relative to each other over the mold core 12c that is positioned in the mold base 12b in a location inside the bushing metal member 10m, the transfer pot 12p is positioned in complementary relation to the mold base. The transfer pot includes a cavity C relative to which a plunger P is slidable as a piston to transmit force represented by arrows F.

The left half of the view of FIGURE 1 represents relationship of parts before molding. The right-hand portion of the view of FIGURE 1 represents production of a bearing surface in a molding procedure in accordance with the present invention after molding. The cavity C has a mascerated phenolic material placed therein for displacement in a semi-fluid state under pressure as can be applied manually or hydraulically relative to the plunger P for effecting transfer of semi-fluid mascerated phenolic represented generally by numeral 16 into the space of numeral 14g that is now completely filled with the mascerated phenolic in a semi-fluid state. Concurrently with the step of filling this space 14g, there is a transferring of force or pressure through the mascerated phenolic to an outer periphery of the Teflon-cotton preform causing the preform to conform to the shape of the mold core 12c including threaded portion 12t. In accordance with the present invention, pressure is maintained on the mold plunger which, together with heat, effects curing simultaneously of both the mascerated phenolic material 16 as well as the phenolic-impregnated cotton or fabric 14f. After this single curing step for both the mascerated phenolic and phenolic impregnated cotton of the preform, the Teflon fibers forming the bearing surface 14t assume a rigid setting which is now firmly backed and permits the mold to be opened and the bushing including the metal member 10m, the cured mascerated phenolic material 16 as well as the preform 14 to be unthreaded from the threaded portion 12t of the mold core 12c. Due to presence of the synthetic fiber such as Teflon, there is no lubrication necessary in service and a permanently threaded portion T is provided relative to the rigid bushing structure. It is to be noted that locking of the mascerated phenolic relative to an inner periphery of the metal member 10m is enhanced by having the metal member provided with a plurality of internal grooves into which flange portions 16f of the phenolic are molded in complementary relationship thereto. Provision of these flange portions 16f assures against axial separation of the metal member 10m relative to the molded material and preform cured in a single operation. As better seen in the view of FIGURE 1–b, the flange portions 16f preferably fit into keyway-type recesses 10k in the metal member 10m such that a locked relationship between the molded material and metal member is established to prevent rotative movement therebetween as well as longitudinal separation as indicated earlier. The keyway-like recesses 10k also serve as slots to permit passage of semi-fluid mascerated phenolic material during transfer thereof under pressure from the cavity C into the annular space 14g.

Figure 2:
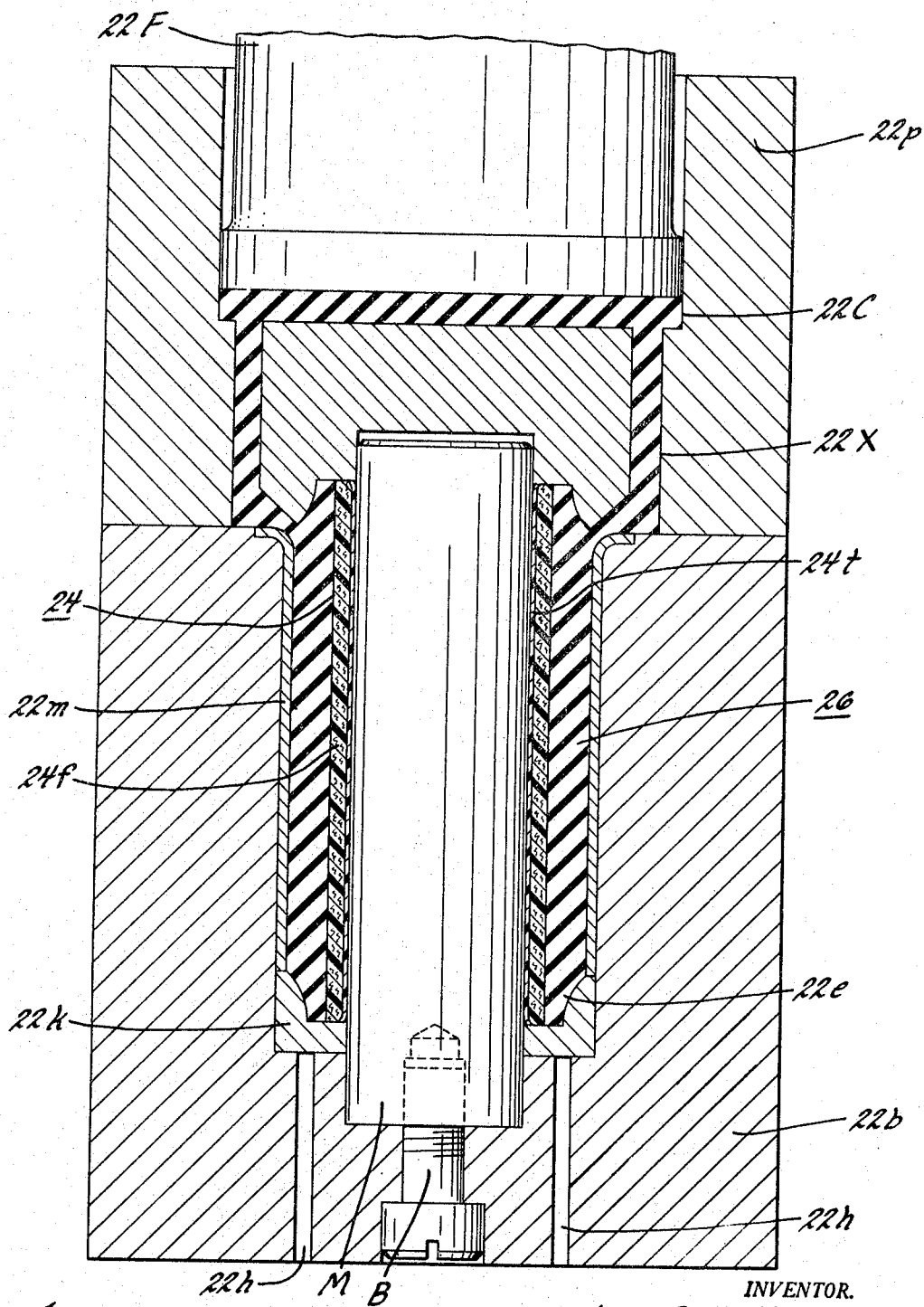

Another molding sequence is illustrated in the view of FIGURE 2 showing a bottom half of a mold 22b and a complementary top half or portion 22b adapted to abut against one end of the bottom portion 22b of the mold. The molding apparatus further includes a plunger 22F used for transmission of force which can be mechanically or hydraulically applied relative to one end thereof. In any event, the plunger 22F transmits the force to an elastomeric material such as rubber and the like in a pot or chamber portion 22C and the elastomeric material is forced through a sprue or passages 22X to fill space between an annular outer metal sleeve or cylinder 22m of a bushing means generally indicated by numeral 22. An annular end 22e of this bushing means 22 abuts against a knock-out ring or annular member 22k located concentrically along an outer periphery of a mandrel M secured to the bottom half of the mold by a bolt means B. To aid in disassembly of the bushing bolted in accordance with the present invention, the bottom half of the mold 22b is provided with knock-out holes 22h which are longitudinally in alignment with the knock-out ring 22k. The molding sequence for the procedure indicated by FIGURE 2 includes the steps of placing the metal annular member 22m into the bottom half of the mold and then placing a woven tubular preform generally indicated by numeral 24 on the mold mandrel M. The preform construction includes a Teflon thread woven as a bearing surface 24t along an inner surface backed by phenolic-impregnated fibrous material such as cotton indicated by numeral 24f visible in views of FIGURES 2, 2–a and 2–b. After placing the preform 24 on the mold mandrel M, there is a step of locating the top of the mold in place relative to the bottom of the mold, and uncured elastomeric material such as rubber and the like is filled into the mold pot or cavity 22C. Then the plunger 22F is placed in position and subjected to pressure for displacing the uncured rubber from the pot or cavity 22C into a gap between the preform means 24 and bushing means 22. During mold closure with the plunger exerting pressure relative to the uncured rubber, the rubber, for example, or other elastomeric material becomes semi-fluid and passes through the passages of the sprue for filling the gap between the preform and inner surface of metal sleeve or member 22m. There is a building up of hydraulic pressure and forces transmitted through the semi-fluid rubber-like material such that the preform 24 conforms to mandrel size. Preferably, the surface of metal member 22m adjacent to the elastomeric material represented generally by numeral 26 is treated for rubber adhesion prior to molding such that the elastomeric material bonds to the metal member 22m simultaneously with curing of both the rubber-like material as well as the phenolic-impregnated fabric or cotton 24f so as to effect a mechanical locking between the Teflon-phenolic liner or preform against rotation internally relative to the metal sleeve or member 22m. The Teflon or polytetrafluoroethylene is threaded and woven relative to a radially inner periphery of the fiber or cotton material which is resiliently backed by the elastomeric material 26 both cured simultaneously. Curing of the rubber or rubber-like material as well as the phenolic simultaneously in the molding procedure in accordance with the present invention accomplishes provision of a bonded rubber to Teflon-phenolic liner and metal outer sleeve rigid externally and internally though resilient intermediate thereto together with a resiliently-backed Teflon-lined bearing surface isolated from metal by resilient or elastomeric means 26. As indicated earlier, the polytetrafluoroethylene bearing surface requires no lubrication in service and provides a wear resistant structure which can be formed to have accurate concentricity with respect to the metal member 22m and any pivot pin (not shown) which can be fitted axially and concentrically therein.

Figure 3:
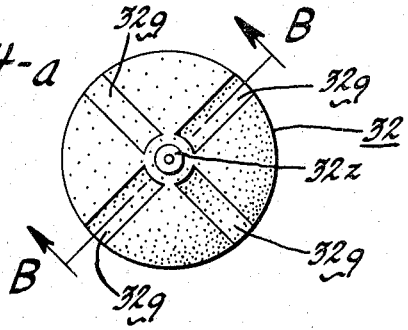
FIGURE 3 is a sectioned elevational exploded view of a ball joint and socket assembly including components made in accordance with the present invention.
Figure 3:
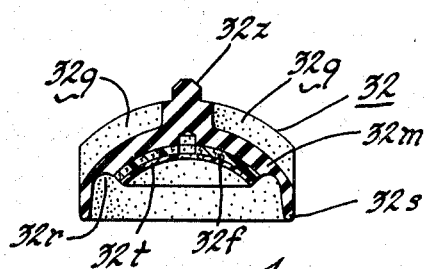
Figure 3:
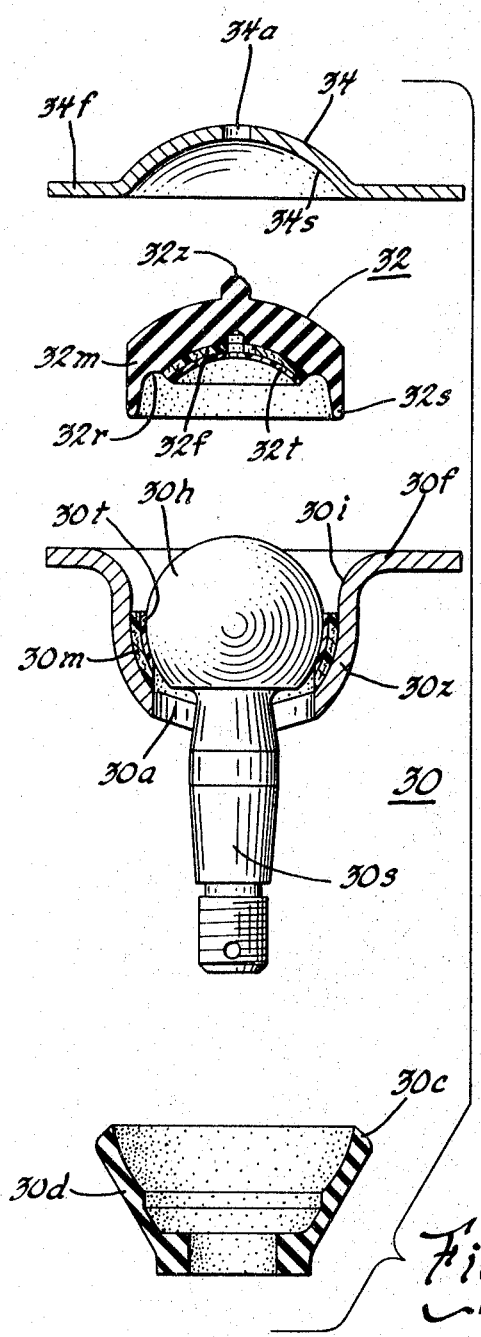

FIGURE 3 illustrates the components or parts of a ball joint and socket assembly generally indicated by numeral 30 and in exploded relation relative to each other. These same parts are shown in assembled relation in FIGURE 4 wherein the same reference numerals are applied. Sequence of assembly is such that first an elastomeric external dirt seal 30d is axially fitted over an end of a stud 30s while a cup portion 30c of the dirt seal fits snugly against a partially spherical body portion or socket 30z provided with an aperture 30a at one end through which the stud 30s projects and opens at an opposite end intermediate laterally extending flange means 30f. Integral with the stud 30s there is a ball or head portion 30h a periphery of which adjacent to the stud end 30s is suported by an annular bearing surface means 30m including a phenolic backing for Teflon cloth or threads 30t rigidly cured relative to each other in a shape complementary to the partially spherical ball or head portion 30h.

In accordance with the present invention, there is provided a combination compression seat and bearing surface means indicated by numeral 32 and specially adapted for use in the ball joint and socket assembly 30. This combination compression seat and surface means is preferably manufactured in accordance with the procedure outlined for FIGURE 2 and includes a bearing surface of polytetrafluoroethylene threads 32t interwoven with one side of a fibrous backing of material such as cotton 32f impregnated with phenolic that is cured simultaneously with curing of elastomeric material 32m forced under pressure in a semi-fluid condition into a suitable mold cavity such that a preform of the Teflon 32t and fibrous backing 32f is forced against a partially spherical portion of a mandrel and then is simultaneously cured with the rubber as a resilient backing therefor. An annular sealing lip portion 32s extends laterally to one side of the preform and is adapted to engage an inner peripheral surface 30i of the socket 30z. This annular sealing portion 32s is adapted to protect the bearing surfaces 30t and 32t as well as the outer partially spherical periphery of head portion 30h against dust and dirt and also against any spattering of the metal such as would be due to welding of the flange portion 30f relative to a complementary flange portion 34f of a cover 34 provided with a central aperture 34a. The cover 34 includes an inner arcuate surface 34s complementary to an upper surface of the combination compression seat and bearing surface means 32 having an upwardly projecting alignment portion 32z adapted to fit the aperture 34a for properly anchoring the combination compression seat and bearing surface means 32 in a predetermined position. This anchoring assures proper engagement of the annular sealing lip portion 32s relative to the inner periphery 30i of the socket for a proper sealing engagement therewith. To enhance flexibility of the annular sealing lip portion, the elastomeric material 32m has an annular recess 32r provided intermediate the inner end of the sealing lip portion 32s and the radially outer end of the preform including the cotton fabric 32f and Teflon fibers as a bearing surface 32t therewith. Simultaneous curing of the elastomeric material and phenolic impregnated relative to the cotton fabric 32f enhances bonding of parts of the combination compression seat and bearing surface means 32 relative to each other and assures proper alignment of the sealing lip portion 32s relative to the upper portion or projection 32z as well as the preform.

The compression seat and bearing surface means 32 serve multiple functions including provision of the Teflon bearing surface requiring no lubrication, provision of resiliently compressible spring means in the form of elastomeric material as well as provision of the circumferential sealing lip as an internal seal to hinder entry of dirt and water into the joint while in service and entry of weld flash during manufacture. The Teflon bearing surface is backed by a rigid phenolic-impregnated fabric which is cured and bonded to the rubber or resilient spring in a single operation. The assembled ball joint with internal and external dirt seals 30d and 32s, respectively, can be packed with a chassis grease at assemly and requires no further lubrication for life. Provision of a unitary molded combination compression seat and bearing surface means 32 including the integral sealing lip portion 32s can be quickly manufactured in a single operation during which resilient material such as rubber and the like is cured and bonded relative to a preform of bearing material including Teflon mechanically woven relative to a phenolic-backed fibrous material such as cotton cured simultaneously and bonded relative to the elastomeric material.

FIGURES 4–a and 4–b illustrate a modification of the combination compression seat and bearing surface means 32 to include a plurality of grooves 32g preferably in each quadrant extending radially away from the aligning portion 32z along an upper surface of the combination seat and surface means. The purpose of these four grooves 32g is to reduce the quantity of elastomeric material included in the compression seat such that a softer reaction occurs in response to forces transmitted axially through the stud 30s relative to the head portion 30h directly in engagement with the Teflon surface 32t from which shock forces are absorbed first by the relatively rigid phenolic-cured fabric portion 32f integrally bonded and cured relative to the resilient or elastomeric means. A lower spring rate is realized due to space provided by these grooves 32g.

FIGURES 4–c, 4–d and 4–e represent further modification of the ball joint and socket means assembly in accordance with the present invention. FIGURE 4–c illustrates a plan view of a modified retainer or cover means 44 used in place of the cover 34 shown in FIGURES 3 and 4. In the embodiment of views of FIGURES 4–c, 4–d and 4–e, there is a combination compression seat and bearing surface means 42 with an alignment portion 42z fitting into an aperture 42a bonded directly relative to a metal inner surface of the retainer or cover 44. The retainer or cover includes a laterally extending flange portion 44f adapted to be welded or bolted into engagement with the complementary flange portion 30f of the socket or body portion 30z and an integral annular sealing lip means 42s is also bolted and bonded directly to metal of the cover or retainer 44. Also, in accordance with the present invention, the elastomeric or resilient material such as rubber and the like for the combination compression seat and bearing surface is cured simultaneously with curing and molding of a preform including a phenolic-impregnated fibrous backing 42f to which a Teflon fiber surface 42t is mechanically stitched. The molding operation is basically the same as that described in the procedure with reference to FIGURE 2. FIGURE 4–e illustrates a fragmentary enlarged view of the sealing lip portion 42s integral with the combination compression seat and bearing surface means 42 bonded directly to metal of flange portion 44f and cover or retainer 44.

FIGURE 5 illustrates a pivotal joint generally indicated by numeral 50 whereby an arm or support means such as in a vehicle suspension system can pivot relative to a bracket attached to a frame or vehicle body. The arm or support means is indicated by numeral 51a and the bracket is indicated by numeral 51b. The bracket includes a laterally extending annular flange 51f relative to which an annular seal 50s is adapted to abut. The elevational enlarged view of FIGURE 5–a illustrated in detail the abutting portion of the seal that includes a Teflon bearing portion 50t adapted to engage an annular surface on one side of the flange 51f. This Teflon bearing surface includes a synthetic fiber mechanically woven into locking engagement with a matrix or preform including fibrous backing 50f that is phenolic impregnated and cured as well as bonded simultaneously into a unitary structure with resilient material such as rubber and the like of the seal 50s including an end portion 50e adapted to engage a lower annual periphery of the socket S or body portion press-fitted into engagement along its outer periphery with an inner surface of the arm or support means 51a having an aperture at one end thereof. A cap or cover means 50c is welded along its outer periphery relative to one end 50E of the socket S. The cap is provided with an apex portion 50z relative to which a conical end 51c of the bracket 51b extends in axial alignment therewith. A smooth cylindrical metallic bearing portion 51m is provided between the annular flange 51f and the conical end 51c. The smooth metal bearing surface 51m projects substantially concentrically and axially relative to the socket S from the bracket through an open end in the socket adjacent to an annular periphery thereof engaged by the annular end 50e of the sealing boot or sealing portion 50s. The socket S as well as a combination compression seat and bearing surface means generally indicated by numeral 56 is molded in a procedure such as described with reference to FIGURE 2. The socket S is comparable to the metal sleeve member 22m shown in FIGURES 2 and 2–a while the combination compression seat and bearing surface means 56 includes an elastomeric material 56m cured and molded simultaneously and integrally with a preform means including a fibrous backing 56f made of fiber such as cotton impregnated with phenolic cured simultaneously with the elastomeric material forced in a semi-fluid condition during molding against the preform such that a Teflon bearing surface 56t conforms precisely to a mandrel having a diameter comparable to the external diameter of the metal bearing surface 51m of the bracket 51b. Since the combination compression seat and bearing surface means 56 is preferably bonded relative to an inner periphery of metal of socket S, there is a locking of the Teflon bearing surface 56t into a predetermined position relative to the socket. The elastomeric means is curved and bonded simultaneously with the phenolic-impregnated preform to which the Teflon fiber of the bearing surface 56t is woven. A resilient backing is provided for isolation of vibration and noise which could be annoying to passengers and also lubrication of the pivot joint is not necessary because the wear resistant Teflon material is resiliently maintained in engagement relative to smooth bearing surface 51m.

It is to be understood that articles of manufacture can be made in accordance with the present invention not only by use of injection molding procedure but also by use of compression and transfer molding procedures such that a preform 14 and the like is urged under hydraulic pressure transmitted through flowable material to conform to mold shape followed by simultaneous curing of the material and preform. During compression molding the aperture such as 34a serves as an air escape as flowable material is supplied to the mold. In addition to thermosetting materials already noted as surable as backing with the preform, it is to be understood that various thermoplastic materials can also be used. Examples of the latter include nylon as backing supplied to a mold or press held closed long enough for phenolic to cure rigid while simultaneous cooling also solidifies the thermoplastic material such as nylon into either a flat or curved backing for a bearing surface made in accordance with the present invention. Nylon is a generic term for any long-chain synthetic polymeric carbonamide which has recurring carbonamide groups as an integral part of the main polymer chain and which is capable of being formed into a filament in which the structural elements are oriented in the direction of the axis. Further details as to compositions and characteristics of nylon can be found in U.S. Patents 2,071,250, 2,071,251, 2,071,252, 2,071,253 and 2,130,948.

Another plastic material that can be used is Lexan having a chemical composition of polycarbonate resin and properties which are more fully set forth in copending application Ser. No. 744,598—Roode, et al. filed June 25, 1958 and belong to the assignee of the present invention. Still a further plastic material that can be used as a backing for phenolic-impregnated fabric interwoven with Teflon is "Delrin" linear acetal resin. "Delrin" is a high-melting, highly crystalline polymer of repeating —$CH_2O$— groups having an excellent combination of properties such as high strength, excellent flexural modulus and fatigue life, outsanding resilience and toughness as well as dimensional stability under conditions of high temperature and humidity during an extended period of stress or during exposure to most solvents. "Delrin" polymer has very good abrasion resistance and a relatively low coefficient of friction.

It is to be noted that a bushing assembly in accordance with the present invention can be made by molding structures such as shown by FIGURES 1, 1–a and 2–a without provision of external metal member 10m, sleeve 22m and the like. In instances where no need for external metal members exists, then an external sleeve or member need not be bonded as an integral part.

While the embodiments of the present invention as herein disclosed constitute preferred forms, it is to be understood that other forms might be adopted.

What is claimed is as follows:

1. A method for manufacturing a combination compression seat and bearing surface comprising the steps of, placing a cylindrical preform member having an inner layer of textile fabric interwoven with polytetrafluoroethylene fibers and an outer concentric layer of fibrous material impregnated with an uncured phenolic resin around a complementary mold core having a portion of one end threaded and the other end a smooth cylindrical surface located within a mold base, placing an outer cylindrical metal member of a diameter greater than said preform member concentrically around said mold core and preform member, positioning a transfer pot in complementary relationship with said mold base, filling the cavity between said outer metal member and said preform member with an uncured elastomeric material in a semifluid condition under sufficient pressure to force said preform member into intimate contact with said mold core and the contours of said threaded portion, simultaneously curing both said elastomeric material and said phenolic resin of said fibrous material into a unitary bonded assembly and unthreading the completed said combination compression seat and bearing surface from said mold core.

2. A bushing insert comprising an internal cylindrical member having a portion of one end threaded and the other end a smooth cylindrical bore comprised of an inner layer of textile fabric having polytetrafluoroethylene fibers woven therein and an outer concentric layer of phenolic impregnated fibrous material, an outer cylindrical sleeve member of metallic material having a plurality of axially spaced peripheral grooves about the interior surface thereof and a resiliently pliable material securely bonded to the exterior surface of said cylindrical member including said threaded end portion, whereby said threaded end portion prevents relative axial movement between said cylindrical member and said pliable material, and completely filling the space between said cylindrical member and said outer cylindrical sleeve member including said axially spaced peripheral grooves to form a unitary bonded assembly.

References Cited

UNITED STATES PATENTS

| | | | |
|---|---|---|---|
| Re. 24,765 | 1/1960 | White | 308—238 |
| 1,900,298 | 3/1939 | Morris | 308—238 X |
| 2,870,295 | 1/1959 | Haroldson | 308—238 X |
| 2,885,248 | 5/1959 | White. | |
| 2,908,532 | 10/1959 | Runton | 308—238 |
| 2,943,009 | 6/1960 | Mirsky. | |
| 2,991,808 | 7/1961 | Siegmann | 138—141 |
| 3,011,219 | 12/1961 | Williams. | |
| 3,017,209 | 1/1962 | Thomas. | |
| 3,055,788 | 9/1962 | Stonhope | 308—238 X |
| 3,082,485 | 3/1963 | Thomas | 308—238 X |
| 3,089,717 | 5/1963 | Gair | 287—93 X |
| 3,094,376 | 6/1963 | Thomas. | |
| 3,131,978 | 5/1964 | White | 308—238 |
| 3,202,749 | 8/1965 | White | 308—238 X |

FOREIGN PATENTS 1,181,482  1/1959  France.

MARTIN P. SCHWADRON, *Primary Examiner.*

DAVID J. WILLIAMOWSKY, *Examiner.*

L. L. JOHNSON, *Assistant Examiner.*